Dec. 11, 1962   L. W. FREIBOTT   3,067,436
ADJUSTABLE MOUNTING FLANGES FOR VALVES
Filed April 3, 1961

INVENTOR.
LEONARD W. FREIBOTT
BY
Lyon & Lyon
ATTORNEYS

United States Patent Office 3,067,436
Patented Dec. 11, 1962

3,067,436
ADJUSTABLE MOUNTING FLANGES FOR VALVES
Leonard W. Freibott, West Covina, Calif., assignor to Crown City Die Casting Co., Pasadena, Calif., a partnership
Filed Apr. 3, 1961, Ser. No. 100,445
3 Claims. (Cl. 4—191)

This invention relates to adjustable mounting flanges for valves, and included in the objects of this invention are:

First, to provide an adjustable mounting flange which, without necessitating any cutting or other alteration of the parts, may be arranged so as to conceal a valve stem protruding from a wall although the protruding length of the valve stem may vary over an extreme range.

Second, to provide an adjustable mounting flange which incorporates the advantages of the Adjustable Handle and Mounting Flange Construction for Shower Valves, set forth in Patent No. 2,896,222, issued July 28, 1959, and adds to these advantages by essentially doubling the range of adjustment.

Third, to provide an adjustable mounting flange for valves which incorporates a first flange element adapted to bear against a wall surface and a seat at its extended end arranged to receive a second flange element in either of two positions, in one position the second flange element being set within the first flange element, and in the other position the second flange element being positioned to extend from the first flange element, the second flange element having screw threads for engagement in either of its positions with a screw-threaded sleeve connected with the valve.

With the above and other objects in view, as may appear hereinafter, reference is directed to the accompanying drawings in which.

Figure 1:
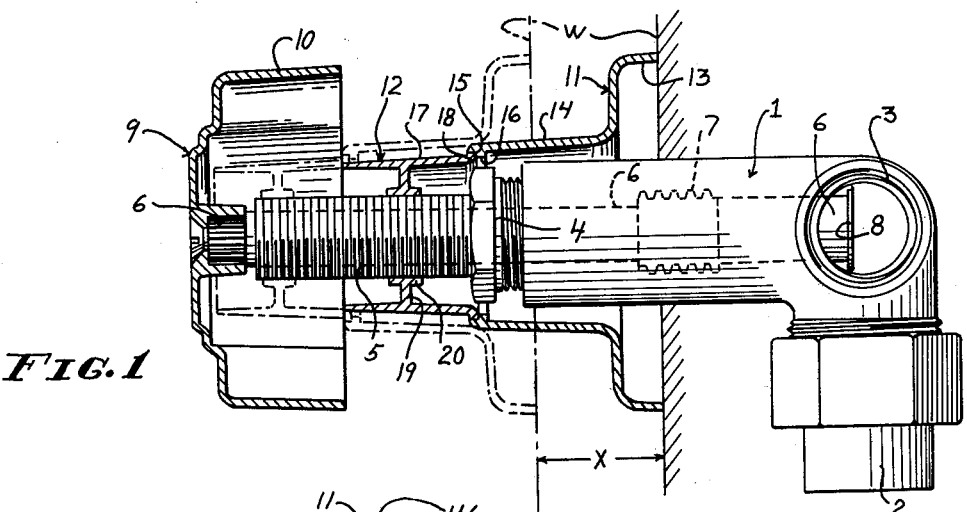
FIGURE 1 is a side elevational view of a valve occupying a maximum extended position and showing the adjustable mounting flanges in cross section and solid lines, occupying their maximum adjusted position, and by broken lines in an intermediate position, the valve handle also being shown in section.

The adjustable mounting flanges are adapted to be used with a valve structure which includes a valve body 1 adapted to protrude from a wall surface W. Behind the wall surface the valve body 1 is provided with an inlet fitting 2 and a outlet 3. The inlet fitting is connected to a source of water supply, not shown, and the outlet 3 is connected to a shower nozzle or other outlet nozzle, not shown.

The protruding portion of the valve body 1 is provided with a packing gland which includes a packing gland nut 4. The packing gland nut 4 is adapted to receive a valve stem sleeve 5 which is externally screw-threaded. The valve stem sleeve 5 and packing gland nut 4 receive a valve stem 6 which extends into the valve body 1 and is provided with suitable screw threads 7, which mate with corresponding screw threads within the valve body 1 for the purpose of moving the valve stem 6 axially. The inner end of the valve stem 6 is adapted to engage a valve seat 8 which separates the inlet portion of the valve from the outlet 3.

The valve structure thus far described may be considered as conventional.

The axially outer end of the valve stem 6 is provided with a handle 9 having a skirt 10, which extends toward the wall W and is adapted to surround and conceal the outer portion of the valve stem sleeve 5.

The exposed portion of the valve body 1 and valve stem sleeve 5 is adapted to be enclosed and concealed by a first flange member 11 and a second flange member 12. The first flange member 11 includes a flared end 13 which is adapted to bear against the wall W. Extending outwardly from the flared end 13 is a tapered tubular portion 14, which terminates in an internal seat 15 formed by an internal shoulder 16.

Figure 2:
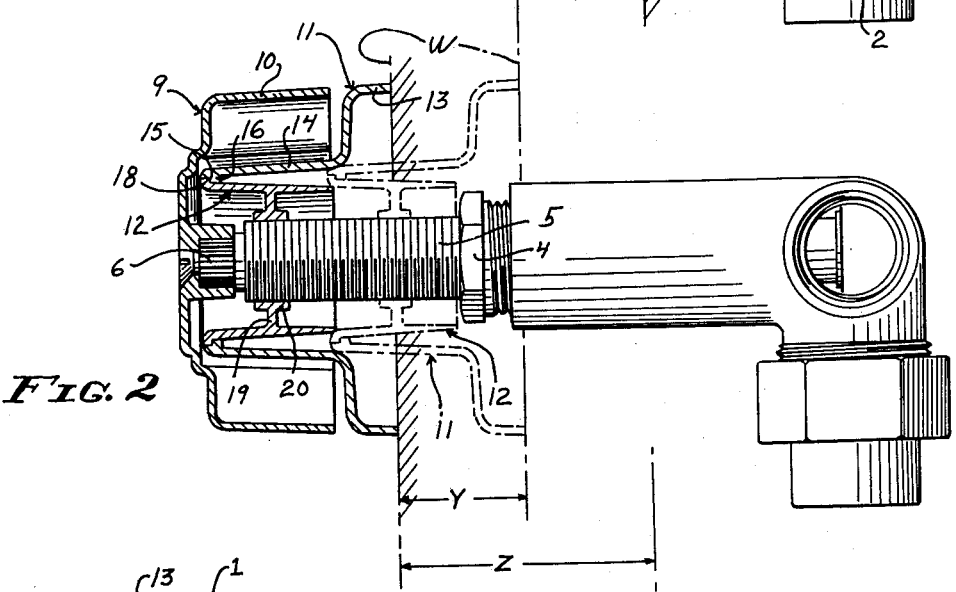
FIGURE 2 is a similar side view of the valve shown in its minimum protruding position with the mounting flanges shown in section and occupying their minimum extended position, and indicating an intermediate position by broken lines, the valve handle being also shown in section.
Figure 3:
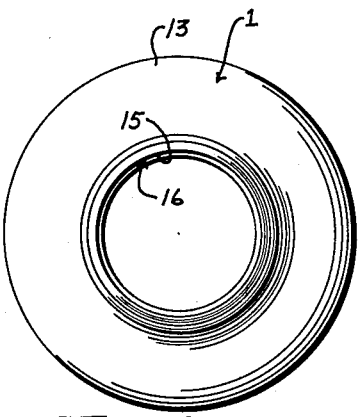
FIGURE 3 is an end view of the inner or first flange element.
Figure 4:
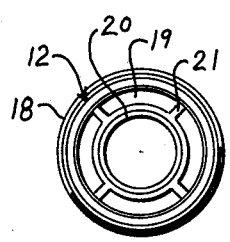
FIGURE 4 is an end view of the outer or second flange element.

The second flange member 12 also includes a tapered tubular portion 17 of smaller diameter than the tubular portion 14. One end of the tubular portion 17 is provided with a rudimentary external flange 18 which is adapted to cooperate with the seat 15. The second flange member 12 is so proportioned that the flange 18 may constitute its axially inner end, as shown in FIGURE 1, or its axially outer end, as shown in FIGURE 2. That is, the second flange member 12 may extend outwardly from the first flange member 11, or project into or telescope within the first flange member.

The second flange member 12 is provided approximately midway between its ends with an internal web 19 which is joined integrally with an internally screwthreaded ring or collar 20. The ring or collar 20 is adapted to be screw-threaded upon the valve stem sleeve 5. The internal web 19 may be provided with radiating ribs 21 so that the second flange member 12 may be engaged by a screw driver or other tool for screw-threading the second flange member upon the valve stem sleeve 5.

The adjustable mounting flanges are utilized as follows: If the valve body 1, valve stem sleeve 5, and valve stem 6 protrude a substantial distance from the wall W, as shown in FIGURE 1, the second flange member 12 is mounted on the first flange member 11 in such a manner that its flange 18 constitutes the axially inner end of the second flange member 12. That is, the second flange member 12 projects outwardly from the first flange member 11.

As shown by solid lines in FIGURE 1, the valve body 1 occupies its major extended position, in which case the extended or wall-directed rim of the skirt 10 of the handle 9 occupies a plane coinciding with the axially outer end of the second flange member 12 so that the valve stem sleeve 5 is concealed. The extended position of the second flange member 12 may be utilized for any position or location of the wall W between the solid line position shown in FIGURE 1 and the broken line position shown therein. That is, the second flange member 12 may accommodate a variation in extension of the valve body 1 and associated parts represented by the distance X, indicated in FIGURE 1.

If the valve body 1 and associated parts protrude a minimum distance from the wall W, the second flange member 12 is placed in an inverted or telescoping position, as shown in FIGURE 2. In this case, the skirt 10 of the handle 9 is in proximity to the flared end 13 of the first flange member 11. However, the second flange is made possible with the use of the valve stem sleeve 5 of accommodate variation in the wall location represented by the distance Y, indicated in FIGURE 2.

It will thus be seen that by selecting either the position shown in FIGURE 1 or the position shown in FIGURE 2 of the second flange member 12, a total range of adjustment Z is provided, as indicated in FIGURE 2. This distance is approximately twice the axial depth of the skirt 10.

It will be observed that this wide range of adjustment is made possible with the use of the valve stem sleeve 5 of standard length. As a consequence, even though the conditions of installation may vary over an extreme range, as represented by the distance Z in FIGURE 2, the same combination of parts may be utilized. That is, the valve may be packaged with the two flange members 11 and 12, a standard valve stem sleeve, and valve handle with the assurance that the valve structure may be mounted in the wall in such a manner as to present a neat and attractive appearance.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. An adjustable mounting flange for wall mounted valves wherein a valve stem and screw-threaded sleeve protrudes from a wall surface, and the valve stem is provided with a handle having a skirt directed toward the wall surface, said mounting flange comprising: a first tubular flange member surrounding said valve stem and sleeve, said first flange member having a wall-engaging end, an extended end, and an annular seat within and facing said extended end; and a second tubular flange member also surrounding said stem and sleeve, said second flange member having a large diametered end and a smaller diametered end, an internally screw-threaded element intermediate its ends for adjustable engagement with said screw-threaded sleeve, and a seating element on the outer periphery of said second tubular flange at its larger end and having oppositely facing axially directed seats for selective seating on said annular seat.

2. A device as defined in claim 1 wherein said first and second flange members are tapered axially; the larger end of said second flange being of less diameter than the smaller end of said first flange; said annular seat being within said smaller end of said first flange.

3. A device as defined in claim 1 wherein said annular seat comprises an axially facing annular shoulder and a cylindrical peripheral wall portion; said seating element comprising a radial flange on the larger end of said second flange member and having a cylindrical peripheral edge snugly fitting within said peripheral wall portion.

References Cited in the file of this patent
UNITED STATES PATENTS

| | | |
|---|---|---|
| 1,031,391 | Spencer | July 2, 1912 |
| 2,059,853 | Daiber | Nov. 3, 1936 |
| 2,896,222 | Freibott | July 28, 1959 |
| 2,972,387 | Severson | Feb. 21, 1961 |